(12) United States Patent
Zimmer et al.

(10) Patent No.: US 8,251,625 B2
(45) Date of Patent: Aug. 28, 2012

(54) CEMENT ANCHOR OF LIGHTWEIGHT CONSTRUCTION PANELS

(76) Inventors: Günther Zimmer, Rheinau (DE);
Martin Zimmer, Rheinau (DE)

(*) Notice: Subject to any disclaimer, the term of this patent is extended or adjusted under 35 U.S.C. 154(b) by 27 days.

(21) Appl. No.: 12/799,511

(22) Filed: Apr. 26, 2010

(65) Prior Publication Data
US 2010/0287875 A1 Nov. 18, 2010

Related U.S. Application Data

(63) Continuation-in-part of application No. PCT/DE2008/001728, filed on Oct. 24, 2008.

(30) Foreign Application Priority Data

Oct. 26, 2007 (DE) .......................... 10 2007 051 626

(51) Int. Cl.
*F16B 39/02* (2006.01)
(52) U.S. Cl. ...................................... 411/82; 405/259.5
(58) Field of Classification Search .................... 411/82, 411/82.1, 82.3; 405/259.5
See application file for complete search history.

(56) References Cited

U.S. PATENT DOCUMENTS

| | | | | |
|---|---|---|---|---|
| 2,092,341 A | * | 9/1937 | De Vries | 52/704 |
| 4,055,051 A | * | 10/1977 | Finney | 405/259.6 |
| 4,514,125 A | * | 4/1985 | Stol | 411/82.3 |
| 4,820,095 A | * | 4/1989 | Mraz | 411/82.3 |
| 4,830,558 A | * | 5/1989 | Sweeney | 411/258 |
| 4,836,729 A | * | 6/1989 | Bisping et al. | 411/82.1 |
| 5,249,899 A | * | 10/1993 | Wilson | 411/82 |
| 6,457,910 B1 | * | 10/2002 | Ludwig et al. | 405/259.1 |
| 6,468,010 B2 | * | 10/2002 | Sager et al. | 411/82 |
| 6,868,597 B2 | * | 3/2005 | Stevenson et al. | 29/460 |

* cited by examiner

*Primary Examiner* — Gary Estremsky
(74) *Attorney, Agent, or Firm* — Klaus J. Bach

(57) ABSTRACT

In a cement anchor for use in lightweight construction panels which anchor comprises a cylindrical body and at least one piston body and which includes a sealed cylinder interior filled with a flowable cement, the cylindrical body has at opposite ends at least one discharge opening which is closed but can be opened by a pressure-controlled valve structure for discharging the cement to the ambient area when installed in the lightweight construction panel.

10 Claims, 7 Drawing Sheets

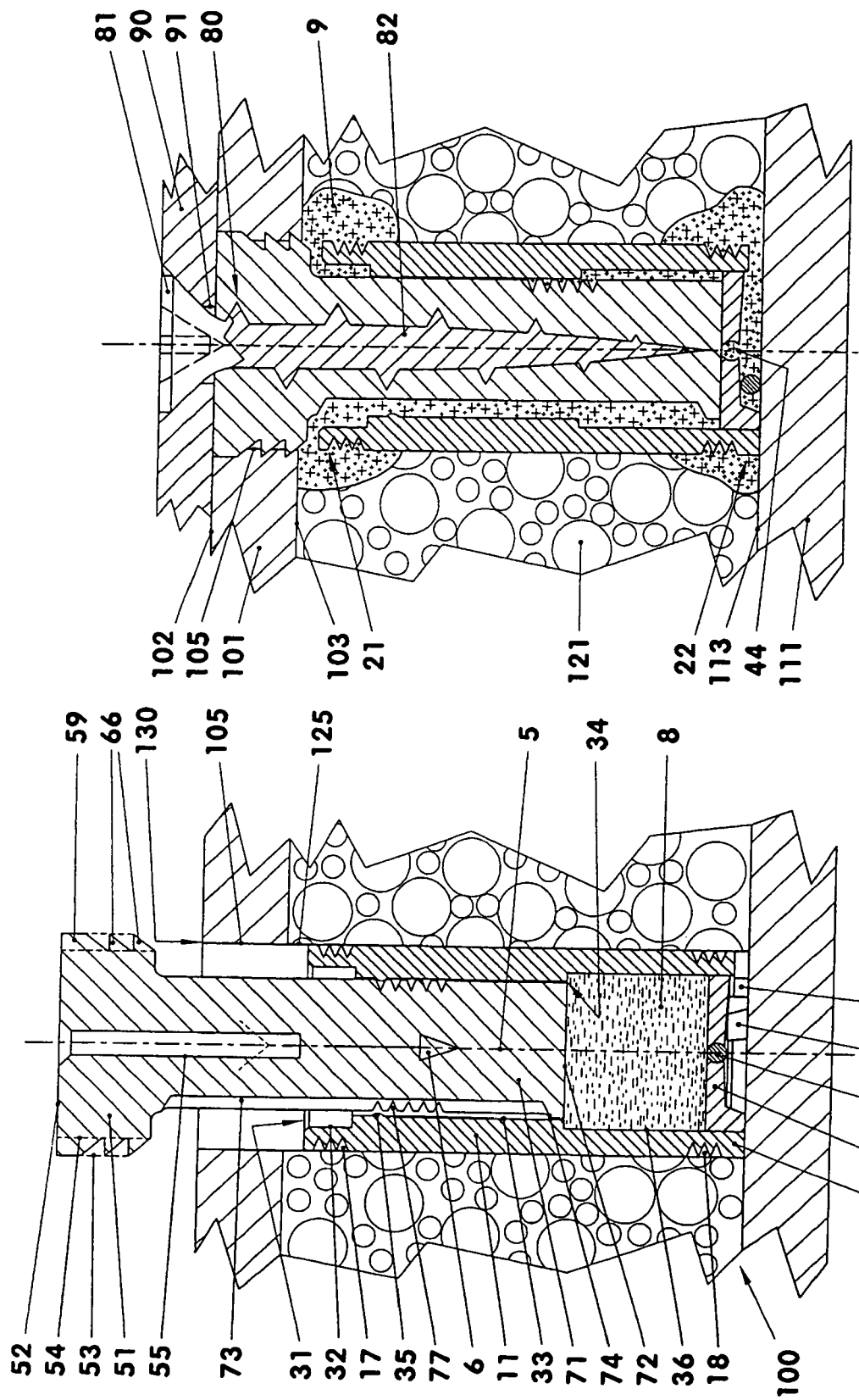

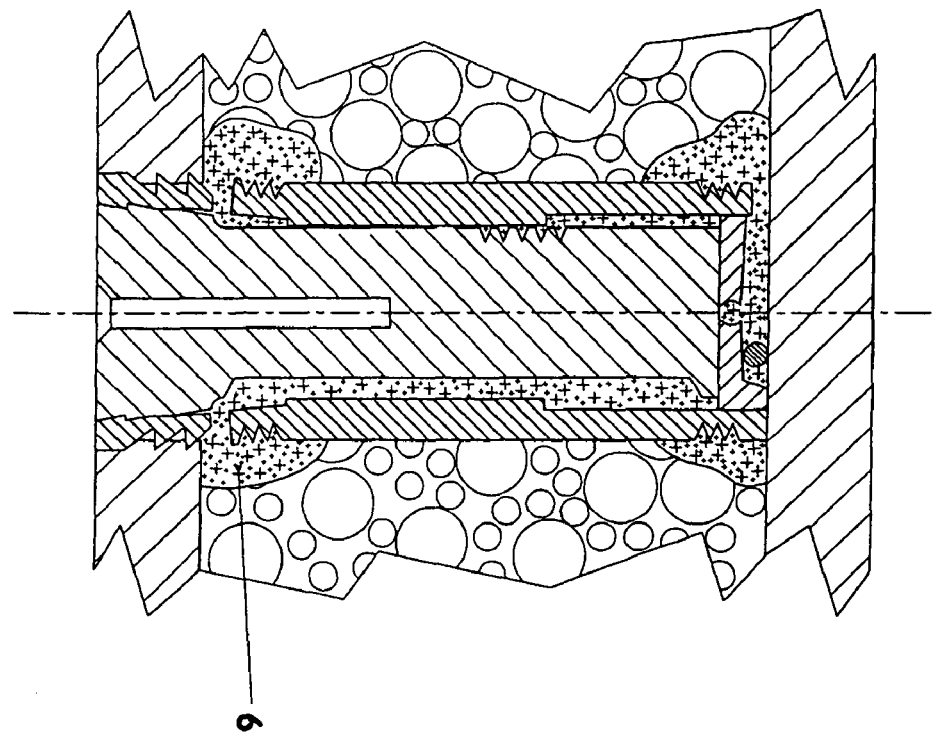
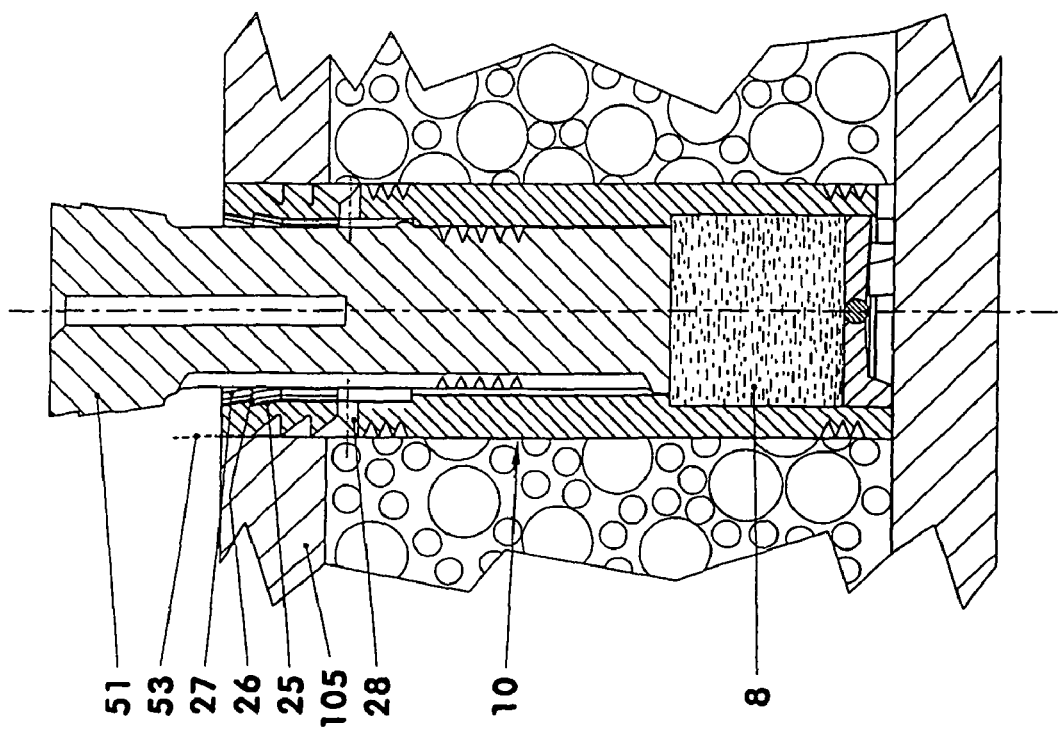

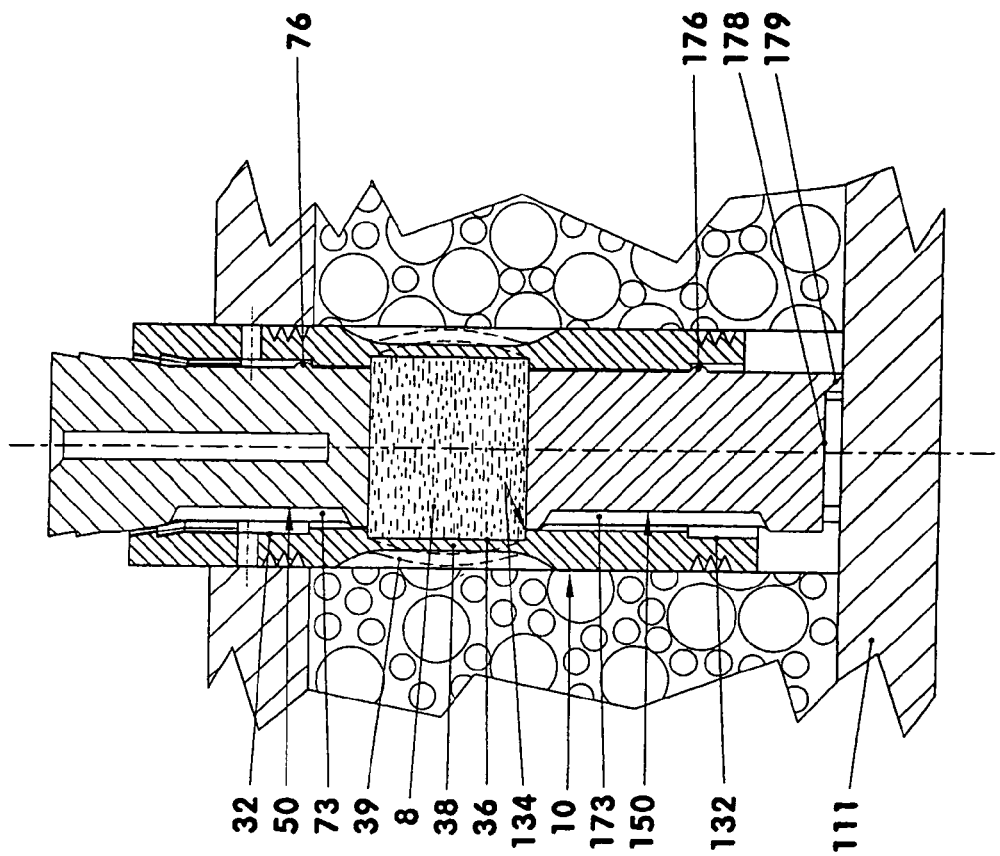
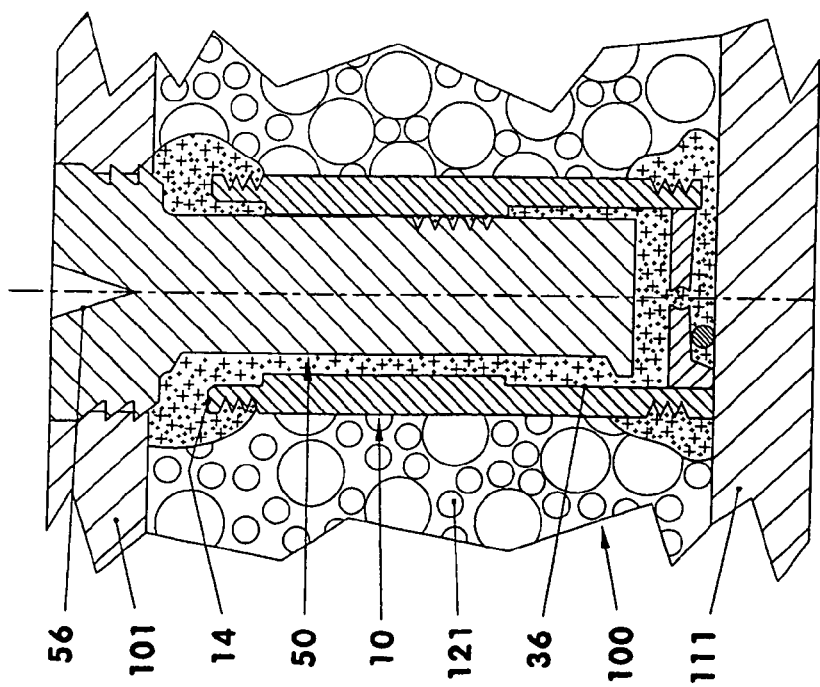

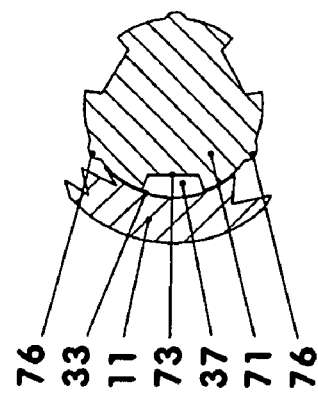
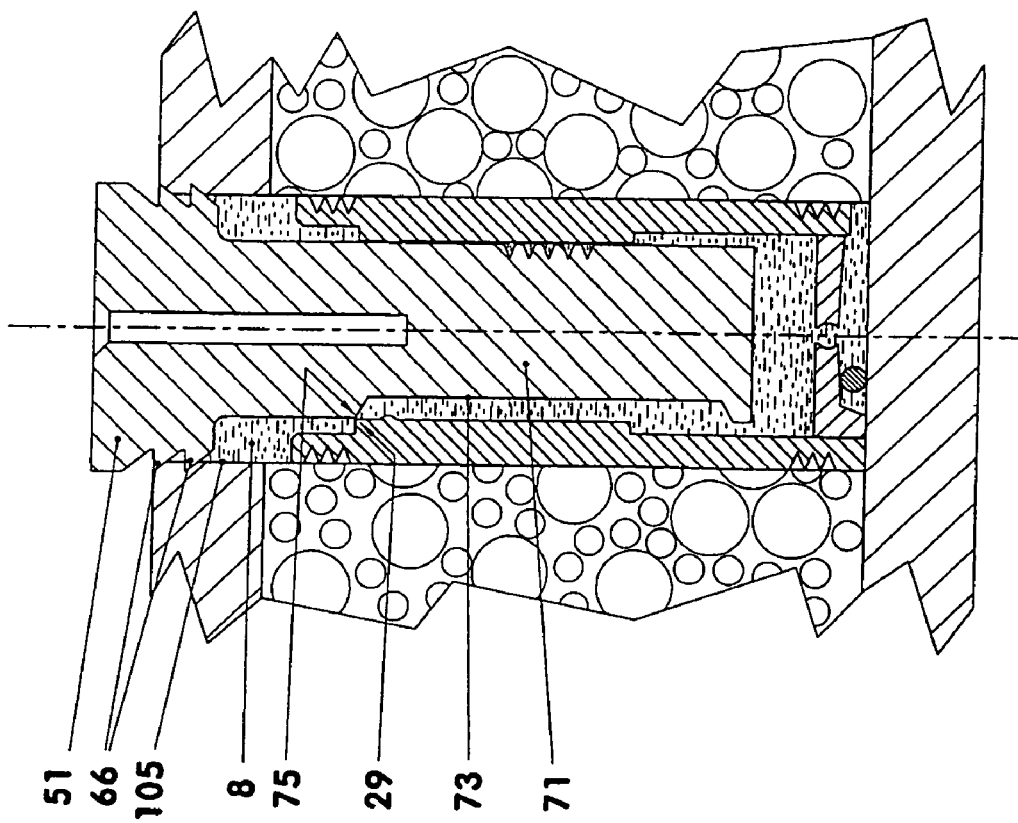

CEMENT ANCHOR OF LIGHTWEIGHT CONSTRUCTION PANELS

This is a Continuous-In-Part Application of pending international patent application PCT/DE2008/001728 filed Oct. 24, 2008 and claiming the priority of German patent application 10 2007 051 626.8 filed Oct. 26, 2007.

BACKGROUND OF THE INVENTION

The invention resides in a cement anchor for use in lightweight construction panels which cement anchor comprises at least a cylindrical body and a piston body extending into the cylindrical body.

The lightweight construction panels are often also called sandwich-or-honeycomb panels. They are generally used in furniture construction and compromise rigid cover layers of wood chip plates, medium-, or hard-fiber plates. The sandwich panels include as center layer or support core for example of polyurethane foam or polysterol. In honeycomb panels, often corrugated web inserts or so-called expanded honeycomb sheets are used as intermediate layers. Most lightweight construction panels have a raw density which is below 500 kg/m$^3$. If for the intermediate layers no fire resistant aluminum foams or expanded glass is used, the raw density is below 350 kg/m$^3$. For comparison, the raw density of a wood chip plate without cover sheets is about 600 to 750 kg/m$^3$.

If hardware is to be mounted to lightweight construction panels for example by means of screws, it is problematic that the fastening means find support only in the relative thin upper cover plate.

In this regard, applicants earlier patent publication 2009-0272065 discloses an anchor consisting of at least two parts which are moved into one another during the installation of the anchor. A partially pot-like component takes on the function of a cylinder whereas a pin-like component takes on the function of a piston. In the bottom of the pot-like component, there is a cement shell whose balloon-like sleeve breaks open when the two anchor parts are moved into one another. The cement then flows into the lower part of the lightweight construction panel.

It is the object of the present invention to provide a cement anchor for a lightweight construction panel, which is easy to install and which is securely and durably retained installed in the lightweight construction panel.

SUMMARY OF THE INVENTION

In a cement anchor for use in lightweight construction panels which anchor comprises a cylindrical body and at least one piston body and which includes a sealed cylinder interior filled with a flowable cement, the cylindrical body has at opposite ends at least one discharge opening which is closed but can be opened by a pressure-controlled valve structure upon installation of the anchor in the lightweight construction panel for discharging the cement to the area around the anchor for fixing the anchor in the light-weight construction panel.

With the present invention, a so-called hydraulic cement anchor is provided on the basis of a cylinder-piston unit, which is filled with a flowable cement material. The piston seals the cylinder; but when the anchor is installed in a bore of a lightweight construction panel and the piston is pushed into the cylinder or, vice versa, the cylinder is moved over the piston, at least one valve is opened. The valve may be a rupture disc or a normal valve or similar structure. Upon opening of the valve, the cement is discharged from the cylinder under pressure. The flowable cement is conducted via bores or channels to locations where it is needed for retaining the anchor in the lightweight construction panel. After the telescopic compression of the cylinder piston unit, the cement hardens around the anchor.

Into the installed unit which may consist for example of a tough plastic material, a screw can be threaded already during curing of the cement.

In order to compensate for an uneven thickness of the lightweight construction panel, these shell-like cement anchors do not need any locking structure between the cylinder and piston bodies. If the cement reservoir of the particular cement anchor is large enough that particular type of anchor may also be used for lightweight construction panels of different wall thicknesses. With thick panels, the piston part is inserted into the cylinder part simply to a lesser degree so that the anchor remains longer.

The invention will become more readily apparent from the following description of particular embodiments thereof on the basis of the accompanying drawings.

BRIEF DESCRIPTION OF THE DRAWINGS

FIG. 3 is a sectional view of a lightweight construction panel with an anchor being inserted, FIG. 4 is a view like FIG. 3 with the anchor fully inserted and some metal hardware mounted thereto, FIG. 5 shows an anchor with an expandable cylindrical body, FIG. 6 shows the anchor of FIG. 5 installed in a lightweight construction panel, FIG. 9 is a sectional view of an anchor installed in a lightweight construction panel having a thick support core, FIG. 10 is a sectional view of an installed anchor with two piston bodies, FIG. 13 shows the anchor of FIG. 3 with shortened channels and the cement partially pushed out, and FIG. 14 is a cross-sectional view of the anchor of FIG. 5 taken at the level of support projections.

DESCRIPTION OF PARTICULAR EMBODIMENTS

Figure 2:
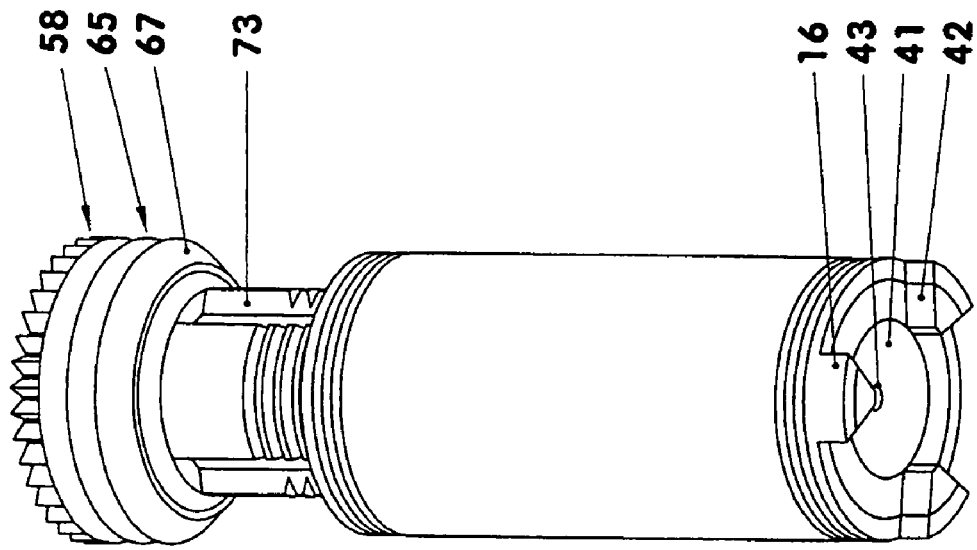
FIG. 2 is a view like FIG. 1, but showing the anchor at an angle from below.
Figure 1:
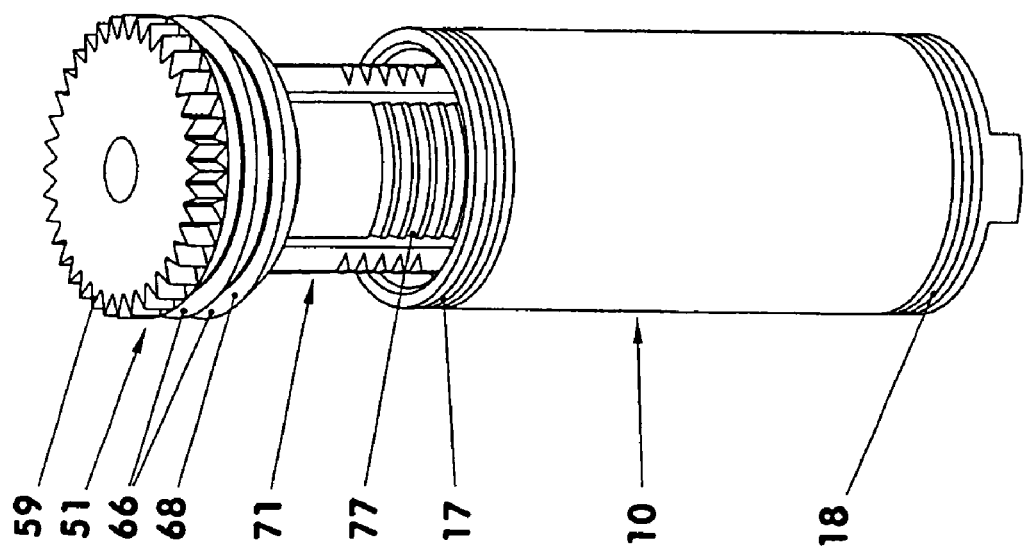
FIG. 1 is a perspective view of an anchor shown at an angle from above.

FIGS. 1 and 2 show a cement anchor in two different views. The cement anchor is shown as it is commercially available. The anchor includes a cylinder body 10 with a cavity 31 in which a piston body 50 is partially inserted. Between the piston body 50 and the cylinder body 10, a flowable cement 8 is enclosed. The cement is for example a polyurethane-based moisture cross-linking glue which, at room temperature, has a density of 4000 to 5000 mPas. The cement solidifies without increase in volume.

FIG. 3 shows a cement anchor according to FIGS. 1 and 2 in a longitudinal sectional view. Its cylindrical body 10 is disposed in a lightweight construction panel 100 without locking means or fixed inserts, see also FIG. 4, on which, by means of the anchor, for example a furniture hardware 90 is to be mounted.

The lightweight construction panel 100 comprises two cover plates 101, 111 with an intermediate support core 121. Each cover plate 101, 111 consists in the shown embodiment of a thin wood chip plate. The support core 121 is in the shown example for example a PU foam core. The cover plates 101, 111 are glued with their inner surfaces 103, 113 to the plate-like support core 121. The lightweight construction panel shown has a wall thickness of 20 to 40 mm. Each cover plate is for example 2 to 8 mm thick. Instead of the foam core also for example a honeycomb structure core may be provided. The lightweight construction panel includes a bore 130 with bore sections 105 and 125.

The lightweight construction panel 100 may also be curved, that is, it may be for example cylindrical or spherical as long as the material thickness of the support core 121 remains at least approximately constant.

For installing an anchor, a bore is drilled into, or respectively through, the cover plate 101 and the support core 121. As drilling tool for example a spiral drill is used, which has a tip angle of 180°. Possibly, also a spot facer may be used. Depending on the type of anchor, the bore 130 may also be drilled by a stepped spot facer. The cavity or bore 130 formed thereby is blown out for example by compressed air or it is suctioned out.

The cylindrical body is a pot-shaped component which comprises a tubular section 11 with a bottom 41. In the shown embodiment, the bottom 41 is clamped, cemented or welded to the tubular section 11. The bottom 41 however may also be formed integrally with the tubular section 11.

In the shown embodiment, the tubular section 11 is provided for example with three legs 16 by which it is supported on the inner surface 113 of the lower cover plate 111. The outer wall of the tubular section 11 is for example essentially cylindrical. At its upper and lower ends, the outer wall is possibly structured. In accordance with FIGS. 3 and 4, there are in each case three circumferential grooves 17, 18. The individual grooves 17, 18 of each group are uniformly spaced. They have a depth of 0.3 to 0.8 mm.

The inner wall of the tubular section 11 is divided into three cylindrical sections, an upper distribution section 32, an intermediate cylinder section 33 and a lower displacement section 36. The distribution section 32 and the displacement section 36 have for example the same diameter as the cylinder section 33. In the upper area of the cylinder section 33 for example six lens-shaped inwardly extending support projections 35 are provided in a transverse plane evenly spaced around the circumference.

The planar bottom 41 is provided at its side facing the displacement area 36 with for example also three legs 42 which abut the inner surface 113 of the lower cover plate 111. They are arranged radially in front of the legs 16 of the tubular section 11. The bottom 41 has for example a central discharge opening 43 in which as closure element 45 a ball is contained.

The piston body 50 comprises a piston section 71 and an engagement section 51. The piston section 71 is essentially cylindrical. It has an outer diameter which corresponds to the inner diameter of the cylinder section 33 of the cylindrical body 10. In the area of its lower front end, that is, the piston bottom area 72, it tightly abuts the cylinder section 33. At the outer wall of the piston section 71, there are for example three channels 73 which are equidistantly distributed over the circumference, see outlet cross-section 37 in FIG. 14, for guiding the flammable cement 8. The individual channels 73 are for example 0.5 mm deep and on average 1.85 mm wide. The channels 73 which extend for example parallel to the center line 5 end at the bottom for example 0.5 to 1 mm ahead of the piston bottom surface 72 whereas their upper ends reach up to the engagement section 51.

The channels 73 may also be formed into the wall of the cylindrical area 33; or the channels may be bores in the components 10 or 50.

In the intermediate area, the outer wall of the piston section 71 is provided with a structure which is intended to improve the adherence of the cement 9 to the piston section 71. To this end, there may be provided for example four notch-like transverse grooves 77, see also FIGS. 1 and 2.

The engagement section 51, which has an outer shape 53, for example, in the form of a cylinder includes two zones with different structures 58, 65. As enveloping surface area, a sleeve-like area is defined on which specifically points of the structures 58, 65 are disposed, which have the same maximum distance from the center line 5. The diameter of this enveloping area 53 is greater than the inner diameter of the bore 130 of the lightweight construction panel 100 in which the cement anchor is inserted.

The first zone of the engagement section 51 includes a longitudinal serration as the structure 58. This longitudinal serration 58 includes transverse grooves with straight pointed teeth 59. In the exemplary embodiment, the tooth width is about 1 mm. The width at the bottom of the teeth is about 0.7 mm. In FIG. 1, the longitudinal serration 58 includes thirty six teeth. The profile angles of the left and right tooth angles are the same. Depending on the embodiment, the number of teeth is between 15 and 50. The serration has a constant pitch.

Alternatively, the structure 58 may comprise an arrangement of adjacent, for example semispherical, nubs.

The second zone of the engagement section 51 includes as surface structure 65, a transverse serration 65. The transverse serration 65 comprises for example two to four circumferential webs 66. All webs 66 have for example the same cross-section and the same cross-sectional shape. The webs are also equidistantly spaced from one another.

Each web 66 has a slide flank 67 and a locking flank 68. The slide flank 67 has the form of a truncated cone envelope whose virtual tip is disposed on the centerline 5—as shown in FIG. 3—below the engagement section 51. The cone angle of the truncated cone envelope is in this case 80°.

At the backside of the slide flank 67, there is for example a planar locking flank 68, which extends in a plane normal to the center line 5. The intersection between the slide flank 67 and the locking flank 68 is disposed on the enveloping area 53.

The last web 66, that is, the web directly adjacent the longitudinal serration converges into the longitudinal serration. The locking flank 68 of this web 66 is present only in the gaps between the teeth of the longitudinal serration 58.

In the exemplary embodiment, the diameter of the enveloping area 53 is greater, by 0.5 mm, than the inner diameter of the bore 105, see FIG. 3. When the piston section 71 is inserted into the bore 130 and the engagement section 51 is pressed into the bore 105, the webs 66 are engaged in the lower part of the cover plate 101 whereas the teeth of the longitudinal serration 58 notch themselves into the generally harder surface layer of the cover plate 101 (see FIG. 4). The core cylinder 54, which is the cylinder defined by the points of the structures 58, 65, which have the smallest distance from the centerline 5 of the cement anchor has here a smaller diameter than the bore 105. Still, the engagement is sufficient to prevent rotation of the anchor.

The upper front face 52 of the engagement section 51 extends in the embodiment of FIG. 4 in the plane of the outer cover plate surface 102. In practice, the front face 52 however is disposed most of the time one to two tenth of a millimeter below the cover plate surface 102.

The engagement section 51 has a central opening 55, that is a cylindrical bore, which includes at the transition to, for example, the planar front face 52, a 45° fase (for example 0.5 mm×45°). The bore 55 into which later an attachment means 80, see FIG. 4, is screwed, has for example a diameter of 1.3 mm. In the exemplary embodiment, the bore 55 serves among others as guide structure for the attachment means 80 to prevent any deviation thereof from the center line 5 when for example screwed into the engagement section 51. The bore 55 is generally shorter than the attachment means 80 to be screwed or pounded into the bore 55. At least in the exemplary embodiment, the bore 55 is not a throughbore.

Of course, the opening 55 may have any other cross-section. It may be oval, polygonal star-like or have any other shape. The opening may also be in the form of a short straight cone 56, see FIG. 9. In this case, the mounting means needs to generate the largest part of the engagement bore by itself.

It is also possible to omit the bore or opening 55, 56 or provide only a dot mark.

For the mounting of furniture hardware 90, the required anchors are generally pressed into the bores 130 of the lightweight construction panel 100 in a single stroke; the respective furniture hardware 90 is then put in place and is attached to the cement anchor by means of screws 80.

Specifically, first the cement anchor is inserted into the bore 130 in such a way that the cylindrical body 10 abuts the inner surface 113 of the lower cover plate 111. The upper front face 14 of the cylindrical body 10 is then disposed for example 0.5 mm below the inner surface 103 of the upper cover plate 101. Upon further insertion of the piston body 50, a pressure is generated in the cylinder area 33 so that the closure element 45 in the bottom 41 moves out of the discharge opening 43. The cement 8 then flows via the opening 45 downwardly and is distributed below the bottom 41. About at the same time, the engagement nubs 35 are released from the transverse groove 77. The piston body 50 moves further downwardly. As soon as the channel ends 74 have passed the lower control edge 34 of the cylinder area 33, cement 8 flows upwardly through the channels 73. This occurs automatically since the cross-section 49 of the discharge opening 43 is substantially smaller than the sum of the cross-sections 37 of the channels 73 (see FIG. 14). The discharge cross-section 43 is effectively a hydraulic throttle.

The cement 8 displaced upwardly collects in the distribution area 32 and in the bore 105. The engagement section 51 now being moved into the bore 105 presses the cement 8 present in the bore 105 into areas below the surface 103. During the following minutes, the cement 8 cures (FIG. 4).

Already during the curing of the cement 8, 9, the furniture hardware 90 may be placed over the cement anchor which then can be fixed by screwing particle board screws 80 into the respective openings 55, 56. This may additionally expand the cement anchor, so that the engagement section is even more firmly fixed in the bore 105. In this way, a mechanical enclosure may be formed at the inner surface 103 of the cover plate 101.

In FIG. 13, a comparable cement anchor is shown. Its piston body 50 however has shorter channels 73. The upper ends 75 of the channels 73 are so selected that the channels 73 extend just beyond the upper control edge 25 of the cylinder section 33 when at least a part of the webs 66 of the engagement section 51 are already disposed sealingly in the bore 105. The upper control edge 29 acts like the control edge of a hydraulic valve. The gap between it and the cylindrical wall of the piston section 71 prevents a back flow of the still liquid cement 8. The cement volume enclosed between the engagement section 51 and the bore 105 can be distributed under pressure only in the upper anchor area. The cement material amount to be distributed at the top can therefore be controlled by the length of the channels 73.

FIG. 9 shows a lightweight construction panel 100, wherein the wall thickness of the support core is greater by a few millimeters than for example in the preceding FIGS. 3 and 4. With respect to its geometrical dimensions, the cement anchor shown corresponds to the cement anchor of FIGS. 3 and 4.

However, here, the free distance between the upper front face 14 of the cylindrical body 10 and the upper cover plate 101 is greater than that shown in FIGS. 3 and 4. As a result, after the normal insertion of the piston body 50, the cement material 8 cannot completely be displaced from the displacement area 36. Then the remaining cement material is missing at the cover plates 101, 111.

Depending on the cement volume requirements, the cement anchor shown can be used for lightweight construction panels of different thicknesses.

FIGS. 5 and 6 show a cement anchor with an upwardly extended cylindrical body 10. It has a length corresponding to the sum of the intermediate layer thickness and the wall thickness of the upper cover plate 101. This length may also be slightly less than the sum. In this variant, the upper area of the cylindrical body 10 supports the two structures 58, 65 of the engagement section 51 according to FIGS. 1 to 4. However, the diameter of the enveloping area 53 is smaller than, or equal to, the inner diameter of the bore 105.

At the inner wall of the cylinder body area at least one support groove 25 is provided whose upper groove flank 26 is for example a planar flank. Additionally, the inner wall includes, in the area where the engagement section 51 is disposed when the anchor is installed, see FIG. 6, a plurality of longitudinal serrations 27. In order to fix this engagement section 51 after installation so as to prevent it rotation in the cylindrical body 10, the outer wall of the engagement section 51 is provided with a comparable structuring wherein the longitudinal serrations 27 are safely engaged.

Between the longitudinal serrations 58 and the three circumferential grooves 17, the cylindrical body 10 includes several circumferentially distributed transverse bores 28 or openings with a non-circular cross-section via which the still liquid cement 8 is distributed during the insertion of the piston body 50 into the cylinder body 10 below the upper core plate 101.

FIG. 6 shows the cement anchor installed. The piston body 50 is completely inserted into the cylindrical body 10 and is locked therein by a corresponding counter structure at least in form-locking engagement with the engagement groove 25. In this case, the engagement section 51 has expanded the upper area of the cylindrical body 10 elastically in order to wedge the longitudinal 58 and transverse serrations 65 into the wall of the bore 105. The hardened cement 9 is distributed in the area of the cover plates 101 and 111.

Figure 8:
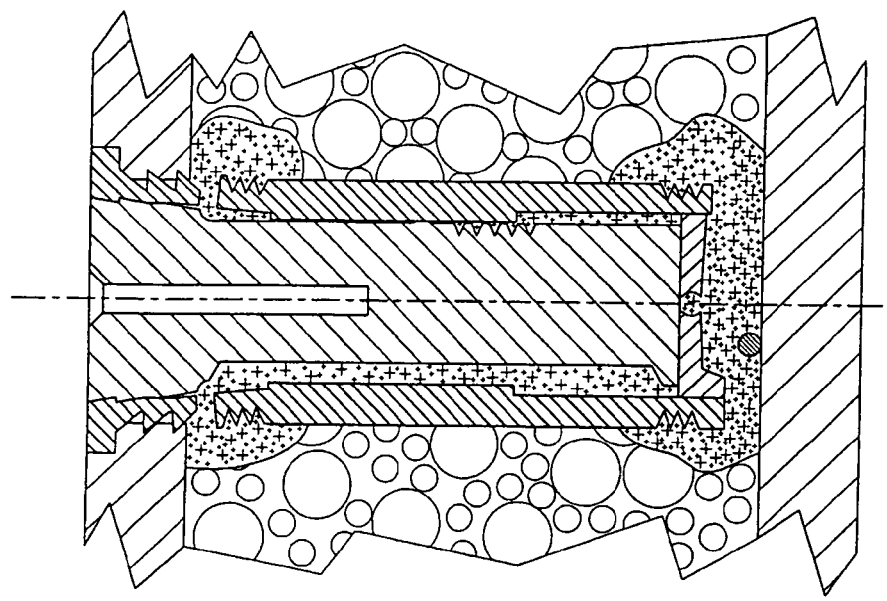
FIG. 8 is a view like FIG. 7 showing the anchor installed.
Figure 7:
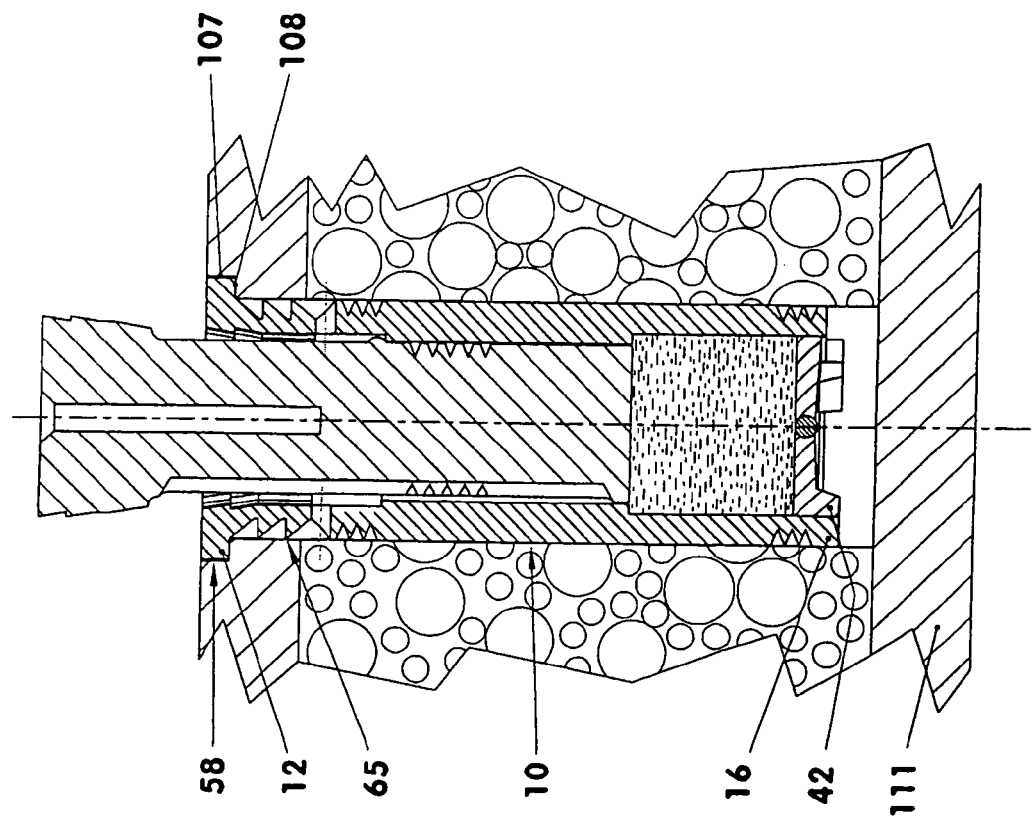
FIG. 7 is a sectional view of an inserted anchor which includes a flange on the cylindrical body.

In FIGS. 7 and 8, the anchor of FIGS. 5 and 7 is provided with a support flange 12. As an example, the cylindrical body 10 is flange-like widened in the area of the longitudinal serrations 58. Its diameter is for example greater, by two millimeters, than the maximum diameter of that of the transverse serrations 65.

At the same time, the bore 105 is a stepped bore. It has at the outer surface of the cover plate 101 a cylindrical recess 107 with a planar base area 108. On this base area 108, the flange 17 of the cylindrical body 10 is disposed after insertion of the cement anchor. The lower area of the cylindrical body 10 is not in contact with the lower cover plate 111 in this variant.

Instead of the stepped recess being cylindrical, the recess may also have the shape of a truncated cone, a spherical shape or another appropriate shape.

The piston body 50 is pressed into the cylinder body 10 as described earlier. Also, in this case, the structures 58, 65 of the cylinder body 10 are wedged into the bore 105, 107.

Figure 12:
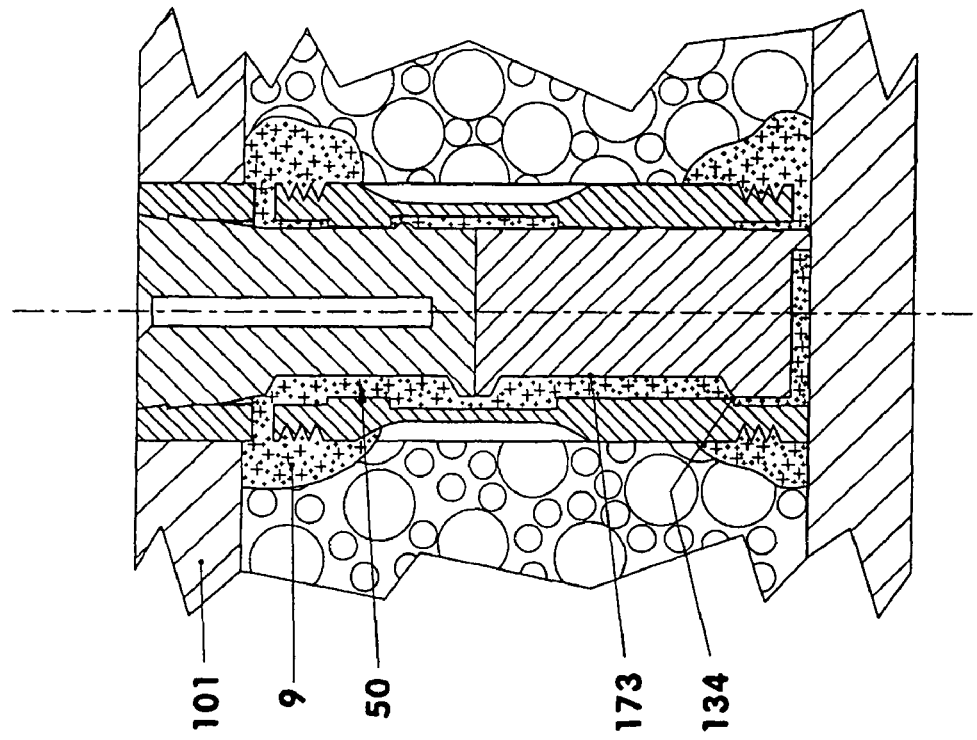
FIG. 12 shows the anchor of FIG. 11 with the upper piston also moved inwardly.
Figure 11:
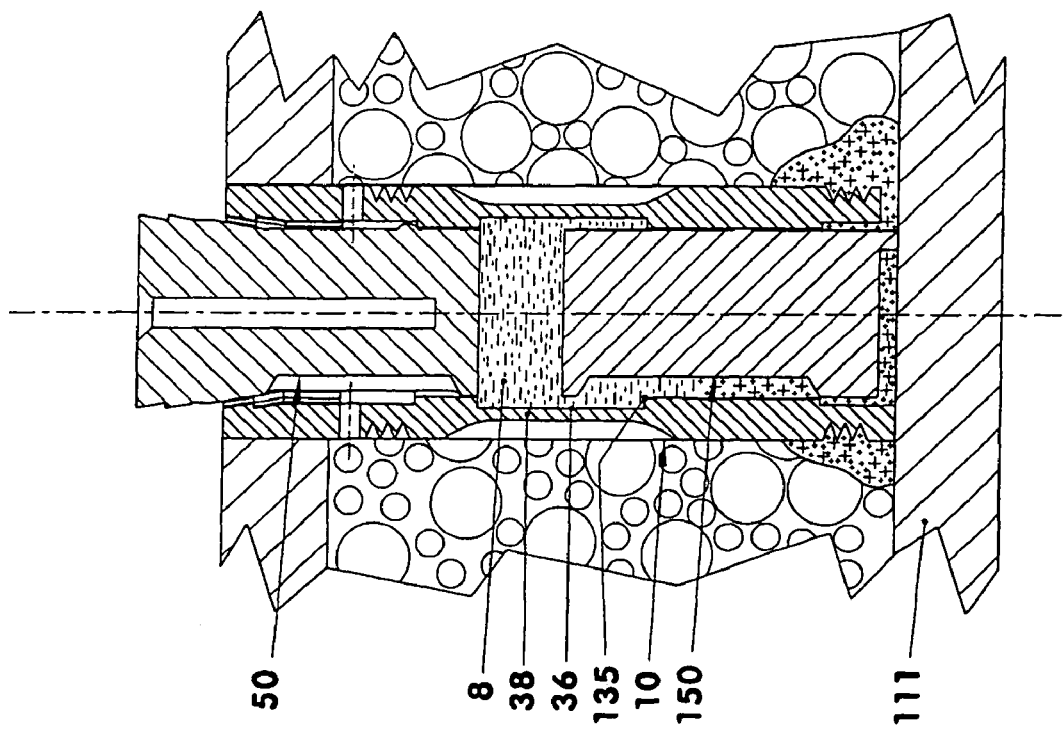
FIG. 11 is a view like FIG. 10 with the cylindrical anchor body fully inserted and the lower piston pushed inwardly.

FIGS. 10 to 12 show a cement anchor with two relatively movable piston bodies 50, 150. The cylinder body 10 of the cement anchor is essentially comparable with the one shown in FIGS. 5 and 6. Only the displacement area 36 is now disposed in the center and the bottom 41 is omitted. In addition, the lower inner area now has a second distribution area 132.

The outer wall of the cylindrical body 10 is not provided in the upper area thereof with any structures. At the level of the displacement area 36, the outer wall is for example recessed in order to increase the elasticity of the wall 38 in this area, see the dashed lines 39 in FIG. 10.

The upper piston body 50 is a shortened version of the piston body shown in FIG. 7. The lower reversed installed piston body 150 has no engagement section. It may be installed so as to prevent rotation in the cylinder body 10 with a particular longitudinal profiling. Both piston bodies 50, 150 abut the cylinder body 10 by engagement nubs 76, 176 disposed in the distribution 32, 132.

For the installation, the cement anchor is first inserted into the bores 130. The lower piston body 150 is then disposed on the cover plate 111. In order to permit cement 8 to flow between the lower piston body 150 and the cover plate 111, the lower surface 178 of the piston body 150 is provided for example with three legs 179.

For distributing the still liquid cement 8, the cylindrical body 10 and the upper piston body 50 are moved jointly downwardly toward the lower cover plate 111. The cylindrical body 10 slides then over the lower piston body 150. As a result of an increased pressure in the displacement area 36, the wall 38 is bent outwardly (see dashed lines 39, FIG. 10). The lower channels 173 extend as a result above the upper control edge 134. The cement 8 flows to the cover plate 111, see FIG. 11. As soon as the cylindrical body 10 abuts the lower cover plate 111, the lower control edge 135 closes the lower channels 173.

Now the upper piston body 50 is moved downwardly. After a slight elastic out-bowing of the wall, the piston body 50 pumps the cement 8 into the area of the upper cover plate 101, see FIG. 12. The upper piston body 50 is engaged in the cylinder body 10 in the above-mentioned manner. After some time, the cement 9 is cured.

In all the shown cement anchors, the cylinder body 10 can be lengthened so as to extend into a dead end bore drilled into the lower cover plate 111, see DE 10 2006 049 954 A1.

An anchor as available commercially is called a non-activated anchor, that is, the sealed displacement area 36 is filled with a flowable cement 8 and the piston body projects from the cylindrical body by the length of its maximum insertion stroke.

| Reference numerals: | |
|---|---|
| 5 | Center line |
| 6 | Anchor installation arrangement |
| 8 | Liquid cement |
| 9 | Solid cement |

| Reference numerals: | |
|---|---|
| 10 | Cylindrical body |
| 11 | Tubular section |
| 12 | Support flange |
| 14 | Front face |
| 16 | legs |
| 17 | Circumferential groove |
| 18 | Circumferential groove |
| 21 | End area, top |
| 22 | End area, bottom |
| 25 | Support groove engagement groove |
| 26 | Planar flank |
| 27 | Longitudinal serration |
| 28 | Transverse bores |
| 29 | Upper central edge |
| 31 | Cavity |
| 32 | Distribution section |
| 33 | Cylindrical section, area |
| 34 | Control edge |
| 35 | Support knob |
| 36 | Displacement section |
| 37 | Outlet cross-section |
| 38 | Wall |
| 39 | Outwardly bent area-dashed lines |
| 41 | Bottom |
| 42 | Legs |
| 43 | Discharge opening |
| 44 | Discharge opening cross-section |
| 45 | Closure element |
| 50 | Piston body |
| 51 | Engagement section |
| 52 | Front face |
| 53 | Enveloping area |
| 54 | Core cylinder |
| 55 | Bore/opening |
| 56 | Conical opening |
| 58 | Structures/serration |
| 59 | Teeth |
| 65 | Transverse structures/serration |
| 66 | Web |
| 67 | Slide flank |
| 68 | Locking flank |
| 71 | Piston section |
| 72 | Bottom area, surface |
| 73 | Channels |
| 74 | Channel end |
| 75 | Channel end |
| 76 | Engagement nubs |
| 77 | Transverse grooves, serration |
| 80 | Attachment means/screw |
| 81 | Screw head |
| 82 | Shaft |
| 90 | Furniture hardware |
| 91 | Bore |
| 100 | Construction panel |
| 101 | Cover plate |
| 102 | Outer surface |
| 103 | Inner surface |
| 105 | Bore section |
| 107 | Cylindrical recess |
| 108 | Base area |
| 111 | Cover plate |
| 113 | Inner surface |
| 121 | Support core |
| 125 | Bore section |
| 130 | Bore |
| 132 | Distribution area |
| 134 | Control edge |
| 135 | Control edge |
| 150 | Lower piston body |
| 173 | Lower channels |
| 174 | Channel ends |
| 176 | Engagement nub |
| 178 | Lower surface |
| 179 | legs |

What is claimed is:

1. A cement anchor for installation in a bore in a light weight construction panel (100), the cement anchor including a cylindrical body (10), at least one piston body (50, 150) disposed in the cylindrical body (10) and forming therein a displacement chamber (36) which is filled with a flowable cement (8), and closed by a front end of the piston body (50, 150) the cylindrical body (10) having a lower end area (22) and an upper end area (21), at least one flow control edge (34, 134) formed in the cylindrical body (10), the cylindrical body (10) and the piston body (50, 150) defining jointly a cement discharge opening for at least one cement flow channel (73, 173) extending from adjacent the front end (72) of the piston body (10) along the piston and cylindrical bodies to at least one of the lower and upper end areas (22, 21) of the cylindrical body (10) for conducting, upon movement of the piston body (10) past the flow control edge (34, 134) during insertion of the piston body (50,150) into the cylindrical body (10), cement from the displacement chamber (36) to at least one of the lower and upper end areas (22, 21) for solidification in the respective end area (22, 21) and locking the piston body (50, 150), the cylindrical body (10) and the whole anchor in place in the light weight construction panel.

2. The cement anchor according to claim 1, wherein the piston body (50, 150) has a central bore (55, 56) for accommodating an attachment means (80).

3. The cement anchor according to claim 1, wherein the piston body (50, 150) is locked in the cylinder (10) when the cement anchor is not activated.

4. The cement anchor according to claim 1, wherein the at least one piston body (50, 150) includes at least one channel (73, 173) which—in the direction of movement of the piston—starts shortly after the piston bottom end face (72) and, with the cement anchor pushed together—ends after the end area (21, 22) of the cylinder body (10).

5. The cement anchor according to claim 1, wherein the cylinder body (10) has a cylinder bottom (41) with a discharge opening (43), which is sealingly closed by a closure element (45) while the cement anchor is not activated.

6. The cement anchor according to claim 5, wherein the closure element (45) is a ball (45) pressed into the discharge opening (43).

7. The cement anchor according to claim 2, wherein the piston body (50) includes means for receiving an attachment means (80).

8. The cement anchor according to claim 7, wherein the piston body (50) includes a central opening (55, 56) whose average diameter is smaller, by 30%, than the core- or minimum diameter of the attachment means (80).

9. The cement anchor according to claim 1, wherein the cylindrical body (10) includes a cylinder area (33) and a displacement area (36) having an inner diameter, which is larger than that of the cylinder area (33) and the piston body (50) is disposed closely adjacent the cylinder area (33) when the cement anchor is not activated.

10. The cement anchor according to claim 9, wherein at least one piston body (50, 150) includes cement-carrying channels (73, 173) whose ends (74, 174) adjacent the piston bottom are spaced from the piston bottom (72) of the piston (50, 150).

* * * * *